United States Patent
Ueki

(10) Patent No.: US 11,060,861 B2
(45) Date of Patent: Jul. 13, 2021

(54) METHOD OF MEASURING UNEVEN SHAPE ON THREE-DIMENSIONAL CURVED SURFACE

(71) Applicant: Toyota Jidosha Kabushiki Kaisha, Toyota (JP)

(72) Inventor: Takashi Ueki, Nagakute (JP)

(73) Assignee: Toyota Jidosha Kabushiki Kaisha, Toyota (JP)

(*) Notice: Subject to any disclaimer, the term of this patent is extended or adjusted under 35 U.S.C. 154(b) by 452 days.

(21) Appl. No.: 15/983,605

(22) Filed: May 18, 2018

(65) Prior Publication Data

US 2018/0340773 A1    Nov. 29, 2018

(30) Foreign Application Priority Data

May 23, 2017    (JP) .............................. JP2017-102091

(51) Int. Cl.
*G01B 21/20* (2006.01)
*G06T 7/00* (2017.01)
*G01B 11/24* (2006.01)

(52) U.S. Cl.
CPC .......... *G01B 21/20* (2013.01); *G01B 11/2416* (2013.01); *G06T 7/0004* (2013.01);
(Continued)

(58) Field of Classification Search
CPC . G06T 2207/10028; G06T 2207/20021; G06T 2207/30164; G06T 7/0004; G01B 11/2416; G01B 21/20
See application file for complete search history.

(56) References Cited

U.S. PATENT DOCUMENTS

| 2009/0168045 A1* | 7/2009 | Lin ..................... G01C 15/002 356/4.01 |
| 2015/0254830 A1* | 9/2015 | Shimodaira .......... G06K 9/4604 382/141 |

FOREIGN PATENT DOCUMENTS

| JP | 2000-97689 | 4/2000 |
| JP | 2000097689 A | * 4/2000 |
| JP | 2005-201695 | 7/2005 |

OTHER PUBLICATIONS

Komori et al., Evaluation method of lead measurement accuracy of gears using a wedge artefact, Meas. Sci. Technol. 20 (Year: 2009).*

* cited by examiner

*Primary Examiner* — Michael J Dalbo
(74) *Attorney, Agent, or Firm* — Oblon, McClelland, Maier & Neustadt, L.L.P.

(57) ABSTRACT

A method of measuring an uneven shape on a three-dimensional curved surface for measuring an uneven shape present on a three-dimensional curved surface of a measurement object and finer than the three-dimensional curved surface, the method comprising: a surface shape data acquiring step of acquiring three-dimensional surface shape data representative of a surface shape of the measurement object; a dividing step of extracting data of a divided portion representative of a surface contour shape of the divided portion from the three-dimensional surface shape data, for each of the divided portions acquired by dividing a surface of the measurement object in a certain dividing direction at regular intervals by a multiplicity of straight lines orthogonal to the dividing direction; a curve equation setting step of obtaining a curve equation approximating the entire area of the surface contour shape represented by the data of the divided portion for each of the divided portions; a difference calculation step of calculating a difference between the data of the divided (Continued)

portion and the curve equation for the entire area of the divided portion for each of the divided portions; and a difference combining step of combining two-dimensional data of the difference calculated for the entire area of the divided portion for each of the divided portions in the dividing direction to generate three-dimensional shape data representative of the uneven shape.

5 Claims, 5 Drawing Sheets

(52) U.S. Cl.
CPC ............... *G06T 2207/10028* (2013.01); *G06T 2207/20021* (2013.01); *G06T 2207/30164* (2013.01)

METHOD OF MEASURING UNEVEN SHAPE ON THREE-DIMENSIONAL CURVED SURFACE

This application claims priority from Japanese Patent Application No. 2017-102091 filed on May 23, 2017, the disclosure of which is herein incorporated by reference in its entirety.

TECHNICAL FIELD

The present invention relates to an uneven shape measuring method capable of measuring a fine uneven shape of about several μm existing on a three-dimensional curved surface having a change in height on the order of millimeters.

BACKGROUND ART

A technique of measuring a tooth surface shape of a gear is described in Patent Document 1, for example. Patent Document 2 describes a technique of removing a low frequency component (trend) from measurement data of a surface shape to extract only a component of an uneven shape such as undulation and roughness.

PRIOR ART DOCUMENT

Patent Document

Patent Document 1: Japanese Laid-Open Patent Publication No. 2005-201695
Patent Document 2: Japanese Laid-Open Patent Publication No. 2000-97689

SUMMARY OF THE INVENTION

Technical Problem

When a three-dimensional curved tooth surface of a gear such as a hypoid gear and a helical gear is ground-finished by a rotary grindstone, NV [Noise, Vibration] performance may deteriorate in a meshing high-order region, and it is thought that this is caused by the presence of minute undulation of unevenness of about several μm on the tooth surface. Verification thereof or improvement of the NV performance requires a technique of extracting an uneven shape of about several μm from a three-dimensional curved surface having a change in height on the order of millimeters due to twisting of a tooth surface; however, sufficient accuracy cannot be obtained from the technique described in Patent Document 1 in which a correction is mechanically made by using a reference member. In Patent Document 2, the surface shape data is divided into a multiplicity of segments to approximate a geometric shape, which increases an error when the uneven shape component is extracted from the surface shape data of the three-dimensional curved tooth surface.

The present invention was conceived in view of the situations and it is therefore an object of the present invention to enable highly-accurate measurement of an uneven shape of about several μm on a three-dimensional curved surface having a change in height on the order of millimeters.

Solution to Problem

To achieve the above object, a first aspect of the present invention provides a method of measuring an uneven shape on a three-dimensional curved surface for measuring an uneven shape present on a three-dimensional curved surface of a measurement object and finer than the three-dimensional curved surface, the method comprising: a surface shape data acquiring step of acquiring three-dimensional surface shape data representative of a surface shape of the measurement object; a dividing step of extracting data of a divided portion representative of a surface contour shape of the divided portion from the three-dimensional surface shape data, for each of the divided portions acquired by dividing a surface of the measurement object in a certain dividing direction at regular intervals by a multiplicity of straight lines orthogonal to the dividing direction; a curve equation setting step of obtaining a curve equation approximating the entire area of the surface contour shape represented by the data of the divided portion for each of the divided portions; a difference calculation step of calculating a difference between the data of the divided portion and the curve equation for the entire area of the divided portion for each of the divided portions; and a difference combining step of combining two-dimensional data of the difference calculated for the entire area of the divided portion for each of the divided portions in the dividing direction to generate three-dimensional shape data representative of the uneven shape.

A second aspect of the present invention provides the method of measuring an uneven shape on a three-dimensional curved surface recited in the first aspect of the invention, wherein the three-dimensional curved surface of the measurement object is a tooth surface of a gear, and wherein the uneven shape includes minute undulation having an amplitude within a range of 0.5 μm to 5 μm.

A third aspect of the present invention provides the method of measuring an uneven shape on a three-dimensional curved surface recited in the first or second aspect of the invention, wherein the three-dimensional surface shape data represents the surface of the measurement object with a multiplicity of pixels arranged in a rectangular (or square) lattice shape in longitudinal and lateral directions and has height information for each of the pixels, wherein at the dividing step, the three-dimensional surface shape data is divided for each pixel in a dividing direction that is one of the longitudinal and lateral directions to extract as the data of the divided portion the height information of a multiplicity of pixels continuous in a cutting direction that is the other direction of the longitudinal and lateral directions, and wherein at the difference calculation step, a difference between the data of the divided portion and the curve equation is calculated for the entire area of the divided portion for each pixel.

A fourth aspect of the present invention provides the method of measuring an uneven shape on a three-dimensional curved surface recited in the third aspect of the invention, wherein the three-dimensional surface shape data has each pixel defined as a rectangular area of 1 μm or less on a side and has height information with a resolution of 0.1 μm or less for each pixel.

Advantageous Effects of Invention

According to such a method of measuring an uneven shape on a three-dimensional curved surface, the data of a multiplicity of divided portions are extracted from the three-dimensional surface shape data representative of the surface shape of the measurement object to obtain the curve equation approximating the surface contour shape represented by the data of the divided portion for each divided portion, and the difference between the data of the divided portion and the curve equation is calculated to generate the uneven shape data by combining the two dimensional data of the difference obtained for each divided portion in the dividing direction, and therefore, a minute uneven shape having an amplitude of about several μm or less, for example, can properly be extracted for visualization (manifestation) or evaluation. In other words, since two-dimensional data of the divided portion are extracted from the three-dimensional surface shape data to calculate the difference between the two-dimensional data of the divided portion and the approximate curve equation and the differences for each divided portion are combined to generate the three-dimensional uneven shape data, the arithmetic processing etc. are easy and the uneven shape can be extracted with high accuracy as compared to when the three-dimensional surface shape data is directly used for calculating a difference from a three-dimensional approximate curved surface equation.

In the second aspect of the invention, measurement is performed for minute undulation (a striated (uneven) pattern) having an amplitude of about 0.5 μm to 5 μm generated on the tooth surface when the three-dimensional curved tooth surface of a gear is ground-finished with a rotary grindstone etc., and since the minute undulation can properly be extracted for evaluation, optimum processing conditions etc. with reduced minute undulation can be set by measuring the minute undulation while adjusting the processing conditions etc., and the NV performance in a meshing high-order region attributable to the minute undulation can be improved.

In the third aspect of the invention, the three-dimensional surface shape data represents the surface shape of the measurement object with a multiplicity of the pixels arranged in a rectangular lattice shape in the longitudinal and lateral directions, and the data is divided for each pixel in a dividing direction that is one of the longitudinal and lateral directions to extract the data of the divided portion and to calculate the difference between the data of the divided portion and the curve equation for each pixel, so that the uneven shape can be extracted with the highest accuracy based on the three-dimensional surface shape data.

In the fourth aspect of the invention, since the three-dimensional surface shape data has each pixel defined as a rectangular area of 1 μm or less on a side and has the height information with a resolution of 0.1 μm or less for each pixel, a minute uneven shape having a wavelength (pitch) of about 0.5 mm to 5 mm and an amplitude of about 0.5 μm to 5 μm, for example, can properly be extracted.

MODES FOR CARRYING OUT THE INVENTION

Figure 1:
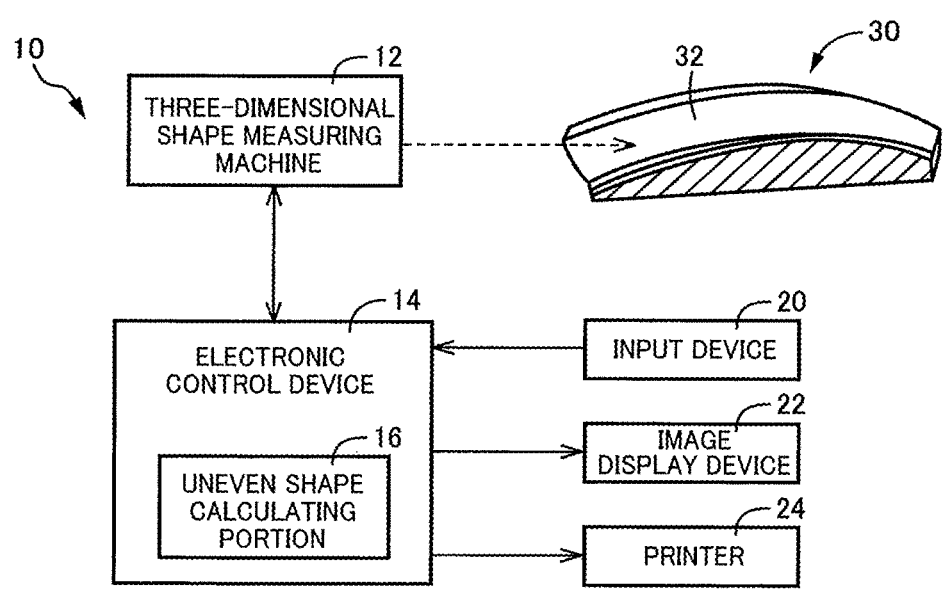
FIG. 1 is a schematic for explaining an example of an uneven shape measuring apparatus capable of measuring an uneven shape on a three-dimensional curved surface according to the method of the present invention.

An uneven shape measuring method of the present invention relates to a three-dimensional curved surface of, for example, a pinion gear of a hypoid gear or a helical gear, having tooth surface height changed on the order of millimeters due to twisting, and is preferably used in the case of measurement of minute undulation having a wavelength (pitch) within a range of about 0.5 mm to 5 mm and an amplitude within a range of about 0.5 μm to 5 μm generated on a tooth surface when the tooth surface is ground-finished by a rotary grindstone. Even in the case of spur gears and other gears without twisting, a tooth surface generally forms a three-dimensional curved shape due to tooth-surface modification such as crowning and bias, and the uneven shape of the tooth surface can be measured by using the method of the present invention. The uneven shape can be measured also on a three-dimensional curved surface of a measurement object other than the gears by using the method of the present invention. The target uneven shape may not necessarily be the minute undulation having a wavelength within a range of about 0.5 mm to 5 mm and an amplitude within a range of about 0.5 μm to 5 μm, and the present invention can be employed even in the case of measuring unevenness out of these ranges, for example, unevenness having a wavelength exceeding 5 mm or an amplitude exceeding 5 μm. The three-dimensional curved surface of the surface of the measurement object may not necessarily have a change in height on the order of millimeters, and the method of the present invention is also usable in the case of measuring an uneven shape of about several μm existing on a substantially flat surface.

At a surface shape data acquiring step, for example, a non-contact three-dimensional shape measuring machine is preferably used such as a confocal laser microscope scanning in longitudinal and lateral directions to acquire height information; however, three-dimensional surface shape data can be acquired by using a two-dimensional shape measuring machine such as a contact type contour shape measuring machine while shifting a measurement position. For example, the three-dimensional surface shape data represents a surface of a measurement object with a multiplicity of pixels arranged in a rectangular lattice shape in the longitudinal and lateral directions and has height information for each of the pixels, and at a dividing step, the data is divided for each pixel in a dividing direction that is one of the longitudinal and lateral directions to extract as data of a divided portion the height information of a multiplicity of pixels continuous in a cutting direction that is the other direction of the longitudinal and lateral directions; however, the division can be made at intervals of one or more pixels depending on a size of the pixels. At a difference calculation step, for example, a difference between data of a divided portion and a curve equation may be calculated for each pixel in an entire area of a divided portion; however, the difference may be calculated at intervals of one or more pixels. Although the three-dimensional surface shape data desirably has each pixel defined as a rectangular area of 1 µm or less on a side and has height information with a resolution of 0.1 µm or less, each pixel may be defined as a rectangular area larger than 1 µm on a side, or the resolution of the height information may be larger than 0.1 µm, depending on a size of the uneven shape to be measured.

At a curve equation setting step, for example, a polynomial equation or a curve equation representing a spline is selected according to a surface contour shape that is an object shape, and a coefficient is determined by a least-squares method etc. At a difference combining step, the uneven shape can be visualized by image display (screen display or printing) in a color-coded manner (with hue, shading, etc.) depending on a magnitude of the difference, or various other forms are available such as automatically calculating of direction, wavelength, amplitude, etc. of the undulation of the uneven shape such as minute undulation from the uneven shape data.

EMBODIMENT

An Embodiment of the present invention will now be described in detail with reference to the drawings.

Figure 2:
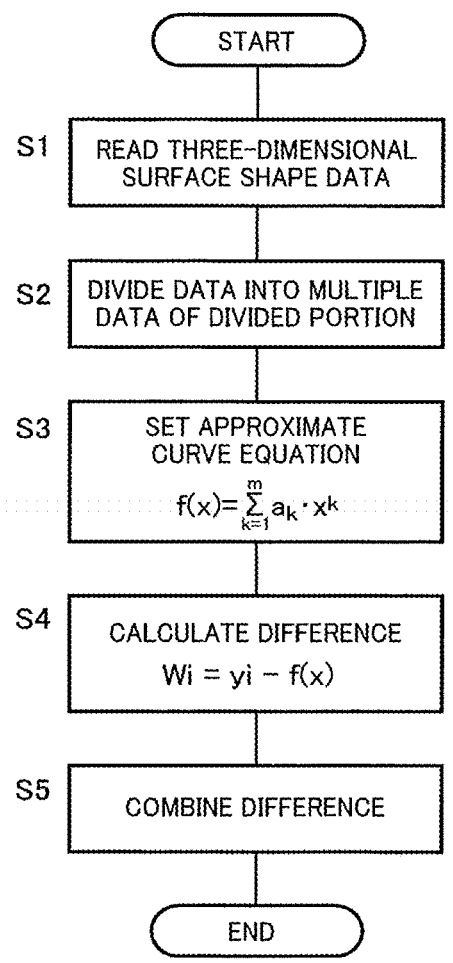
FIG. 2 is a flowchart for specifically explaining a process procedure when an uneven shape is measured by using the uneven shape measuring apparatus of FIG. 1.

FIG. 1 is a schematic for explaining an uneven shape measuring apparatus 10 capable of measuring an uneven shape on a three-dimensional curved surface according to the method of the present invention, and the apparatus 10 includes a three-dimensional shape measuring machine 12 and an electronic control device 14. For the three-dimensional shape measuring machine 12, for example, a confocal laser microscope is used that scans a measurement object surface in the longitudinal and lateral directions to acquire its height information in a non-contact manner. The electronic control device 14 is configured to include a so-called microcomputer including, for example, a CPU, a RAM, a ROM, and an input/output interface, can execute various signal processes according to input signals from an input device 20 such as a keyboard and a mouse, and can show images on an image display device 22 such as a liquid crystal panel or print the images with a printer 24 for the height information in a color-coded manner etc. according to three-dimensional surface shape data D1 supplied from the three-dimensional shape measuring machine 12, for example. The device 14 also includes an uneven shape calculating portion 16 measuring the uneven shape according to a flowchart of FIG. 2. The flowchart of FIG. 2 is a chart of a process procedure for measuring the uneven shape, and the uneven shape calculating portion 16 executes predetermined arithmetic processing etc. according to, for example, an operator's operation for commanding or selection, or the calculating portion 16 can be configured to completely automatically execute the processing.

FIG. 1 shows the case of measuring an uneven shape of a tooth surface 32 of a pinion 30 of a hypoid gear that is a measurement object. The tooth surface 32 has a three-dimensional curved surface shape having a tooth surface height changed on the order of millimeters due to twisting, and when the tooth surface 32 is ground-finished by a rotary grindstone, minute undulation may occur at a wavelength of about 0.5 mm to 5 mm and an amplitude of about 0.5 µm to 5 µM. The uneven shape measuring apparatus 10 of this embodiment is used for measuring the minute undulation as the uneven shape.

Figure 3:
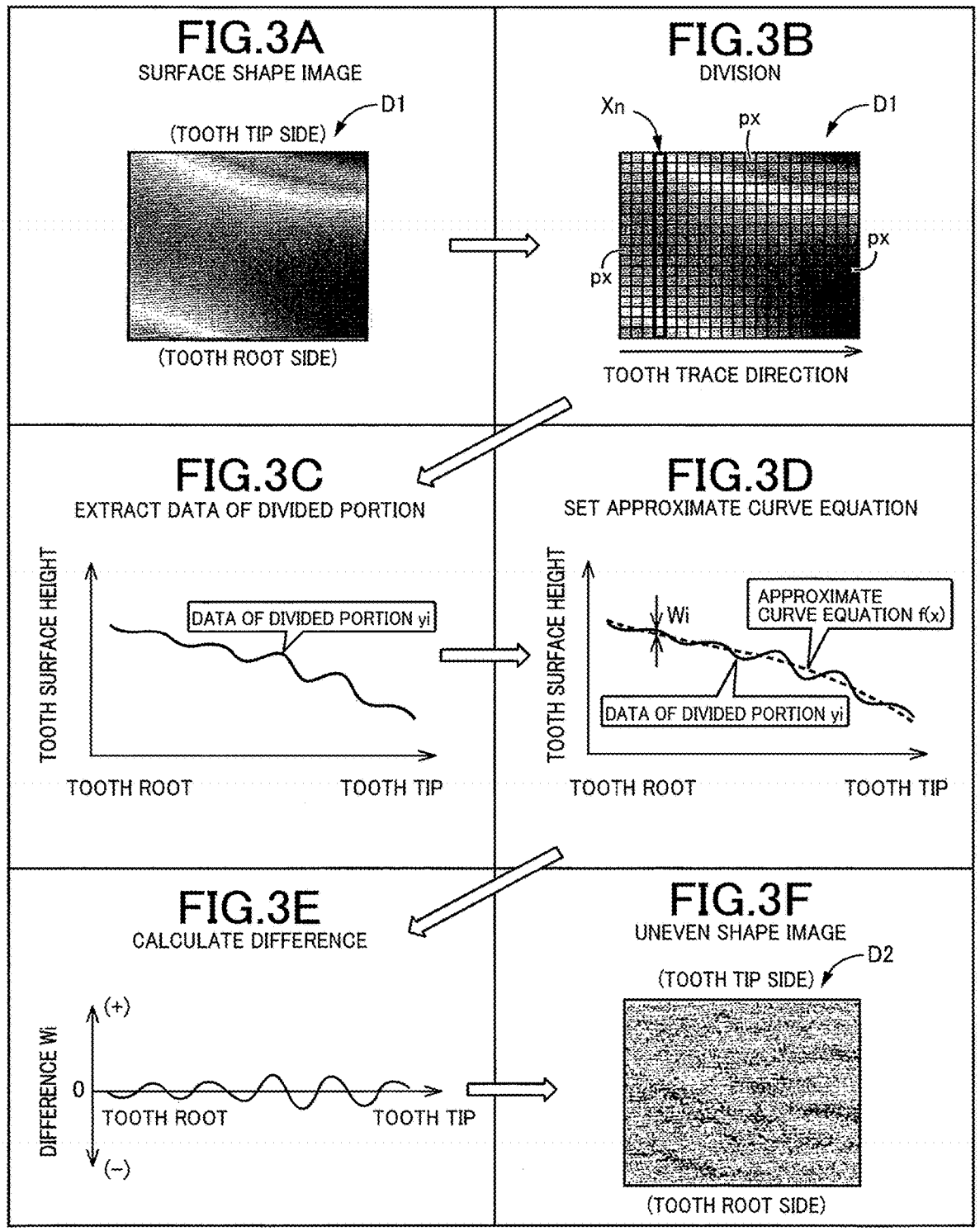
FIGS. 3A to 3F are diagrams for explaining specific details of processes when an uneven shape is measured according to the flowchart of FIG. 2.

The process procedure will be described according to steps S1 to S5 (hereinafter simply referred to as S1 to S5) of the flowchart of FIG. 2. At S1, the surface shape of the tooth surface 32 is measured by the three-dimensional shape measuring machine 12, and the three-dimensional surface shape data D1 representative of the surface shape is read. FIG. 3A shows an enlarged surface shape image of a portion of the surface shape of the tooth surface 32 represented by the three-dimensional surface shape data D1, which is displayed on the image display device 22, and shading (difference in hue on the actual screen) represents the height information. From the surface shape image of FIG. 3A, a change in height on the order of millimeters can be identified; however, the minute undulation having an amplitude of about 0.5 µm to 5 µm cannot be identified since these minute undulation is hidden due to the change in height on the order of millimeters. The process of S1 corresponds to a surface shape data acquiring step.

The three-dimensional surface shape data D1 represents the tooth surface 32 with a multiplicity of pixels px arranged in a rectangular lattice shape (a checkerboard pattern) in the longitudinal and lateral directions and has the height information for each of the pixels px. Therefore, the surface shape image of FIG. 3A is displayed with a multiplicity of the pixels px arranged in a rectangular lattice shape as shown in FIG. 3B and, at S2 of FIG. 2, the data D1 is divided for each pixel px in a dividing direction that is one of the longitudinal and lateral directions to extract as data yi of a divided portion the height information of the multiplicity of the pixels px continuous in a longitudinal direction of the divided portion (i.e. cutting direction) that is the other direction of the longitudinal and lateral directions for each of divided portions. FIG. 3B is a diagram of the surface shape image of FIG. 3A divided for each pixel px and shows the case of using a tooth trace direction as the dividing direction for dividing in the tooth trace direction for each pixel px so that the surface shape image is cut into a multiplicity of divided portions in a tooth depth direction orthogonal to the tooth trace direction, and the height information of all the pixels px in the tooth depth direction from a tooth root to a tooth tip is extracted for each of the divided portions as the data yi of the divided portion representative of a surface contour shape of the divided portion. In FIG. 3B, a column Xn surrounded by a bold line represents one divided portion. The three-dimensional shape measuring machine 12 can measure a surface height for each pixel px defined as a rectangular area of 1 µm or less (e.g., about 0.2 to 0.3 µm) on a side with a resolution of 0.1 µm or less (e.g., about several tens of nm). FIG. 3C shows an example of the data yi of the divided portion representative of a surface contour shape of one divided portion. The process of S2 corresponds to the dividing step.

At S3 of FIG. 2, a curve equation f(x) is obtained approximating the entire area of the surface contour shape represented by the data yi of the divided portion, i.e., the surface contour shape from the tooth root to the tooth tip, for each divided portion. In this embodiment, a coefficient ak is determined with a least-squares method by using an approximate curve equation that is a polynomial equation shown at S3 of FIG. 2. Since the entire area of the surface contour shape is approximated, the continuity of low frequency components of the shape is ensured, and the approximation is less affected by local data dispersion of the three-dimensional shape measuring machine 12. A broken line of FIG.

3D is an example of the approximate curve equation f(x) for one divided portion set in this way. The process of S3 corresponds to the curve equation setting step.

At S4 of FIG. 2, for each divided portion, a difference Wi between the actual data yi of the divided portion and the approximate curve equation f(x) is calculated for each pixel px for the entire area of the divided portion. FIG. 3E is an example of the difference Wi related to one divided portion. The process of S4 corresponds to the difference calculation step. The processes of S2 to S4 may collectively be executed for each divided portion and repeated as many times as the number of the divided portions, or the processes of S2, S3, and S4 may be executed in order for all the divided portions.

Figure 4:
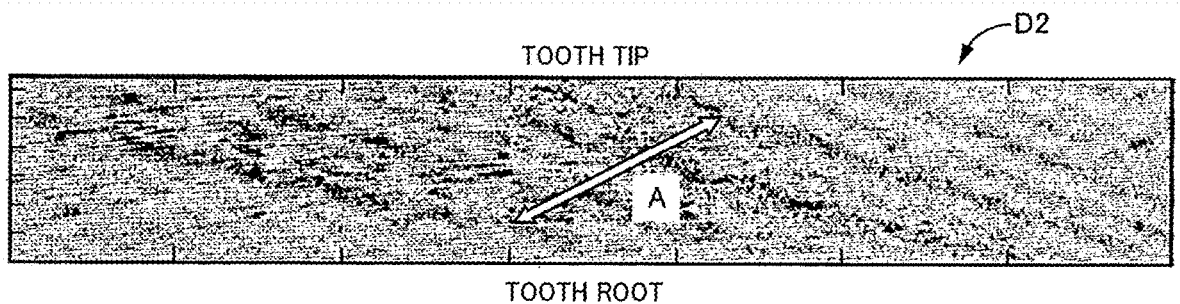
FIG. 4 shows an example of an uneven shape image of the entire tooth surface.

At S5 of FIG. 2, two-dimensional data of the difference Wi calculated for the entire area of the divided portion for each divided portion is combined in the dividing direction, i.e., the tooth trace direction in this embodiment to generate three-dimensional uneven shape data D2 representative of the uneven shape. Specifically, the differences Wi between the surface contour shape (data yi of the divided portion) and the approximate curve equation f(x) respectively calculated for a multiplicity of the divided portions in the tooth depth direction are combined (arranged along the tooth tracing direction) to generate the uneven shape data D2. FIG. 3F shows a portion of an uneven shape image represented by the uneven shape data D2, i.e., an image corresponding to FIG. 3A, which is displayed on the image display device 22, and shading (difference in hue on the actual screen) represents unevenness. This uneven shape image is substantially obtained by removing the change in height on the order of millimeters due to twisting etc. of the tooth surface 32 from the surface shape image of FIG. 3A, and minute undulation having an amplitude of about 0.5 μm to 5 μm can be identified. FIG. 4 shows an example of the uneven shape image of the entire tooth surface 32, and it can be seen that minute undulation having a wavelength (pitch) of several mm and an amplitude of about several μm is present in directions of an arrow A. The process of S5 corresponds to the difference combining step.

Figure 5:
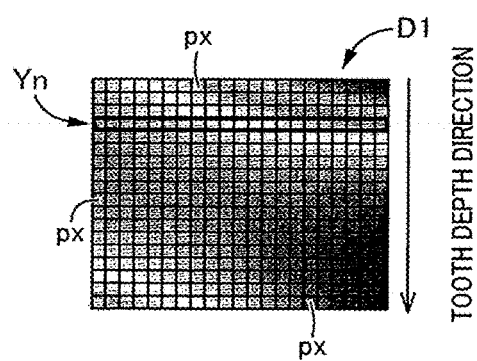
FIG. 5 is a diagram of a surface shape image of FIG. 3A divided for each pixel where the surface shape image is cut into a multiplicity of divided portions in a tooth trace direction by defining a tooth depth direction as a dividing direction.

In the embodiment, as shown in FIG. 3B, description has been made of the case of using the tooth trace direction as the dividing direction for dividing in the tooth trace direction for each pixel px to extract the data yi of a multiplicity of divided portions in the tooth depth direction orthogonal to the tooth trace direction; however, as shown in FIG. 5, the tooth depth direction can be used as the dividing direction for dividing in the tooth depth direction for each pixel px to extract the data of a multiplicity of divided portions in the tooth trace direction orthogonal to the tooth depth direction before executing the processes of S3 to S5 to generate the uneven shape data D2. In FIG. 5, a row Yn surrounded by a bold line represents one divided portion. Alternatively, the divisions can be performed in both the tooth trace direction and the tooth depth direction before executing the processes of S3 and S4 for the divided portions in each direction to generate the uneven shape data D2 by using an average value etc. of two differences Wi respectively obtained for each pixel px with respect to a divided portion in the tooth depth direction and a divided portion in the tooth trace direction. In this case, the influence of an approximation error etc. of the approximate curve equation f(x) is reduced so that the measurement accuracy of the uneven shape is further improved.

As described above, according to the method of measuring an uneven shape on a three-dimensional curved surface of this embodiment, the data yi of a multiplicity of divided portions are extracted from the three-dimensional surface shape data D1 representative of the surface shape of the tooth surface 32 to obtain the curve equation f(x) approximating the surface contour shape represented by the data yi of the divided portion for each divided portion, and the difference Wi between the data yi of the divided portion and the approximate curve equation f(x) is calculated to generate the uneven shape data D2 by combining the two dimensional data of the difference Wi obtained for each divided portion in the dividing direction, and therefore, a minute uneven shape having an amplitude of about several μm or less can properly be extracted for visualization (manifestation) or evaluation. In other words, since two-dimensional data yi of the divided portion are extracted from the three-dimensional surface shape data D1 to calculate the difference Wi between the two-dimensional data yi of the divided portion and the approximate curve equation f(x) and the differences Wi for each divided portion are combined to generate the three-dimensional uneven shape data D2, the arithmetic processing etc. are easy and the uneven shape can be extracted with high accuracy as compared to when the three-dimensional surface shape data D1 is directly used for calculating a difference from a three-dimensional approximate curved surface equation.

Figure 6:
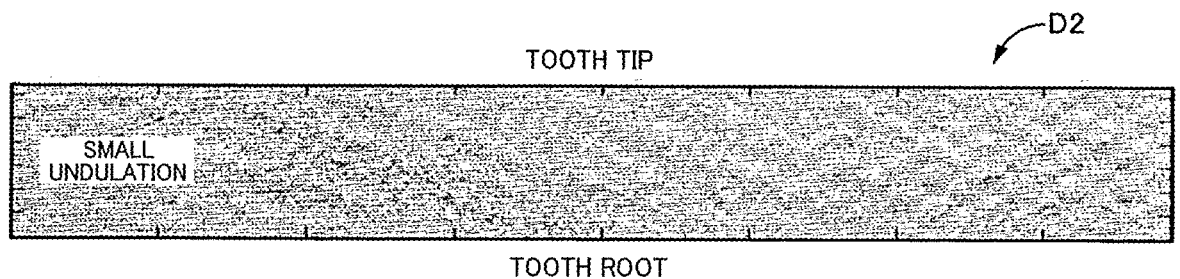
FIG. 6 is a view of another example of the uneven shape image of the entire tooth surface corresponding to FIG. 4, relating to a gear obtained by changing processing conditions etc. of ground finish.
Figure 7:
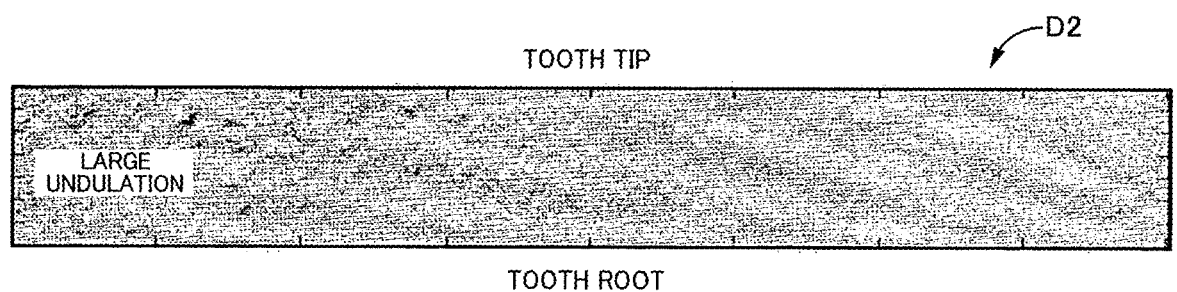
FIG. 7 is a view of still another example of the uneven shape image of the entire tooth surface corresponding to FIG. 4, relating to a gear obtained by changing processing conditions etc. of ground finish.
Figure 8:
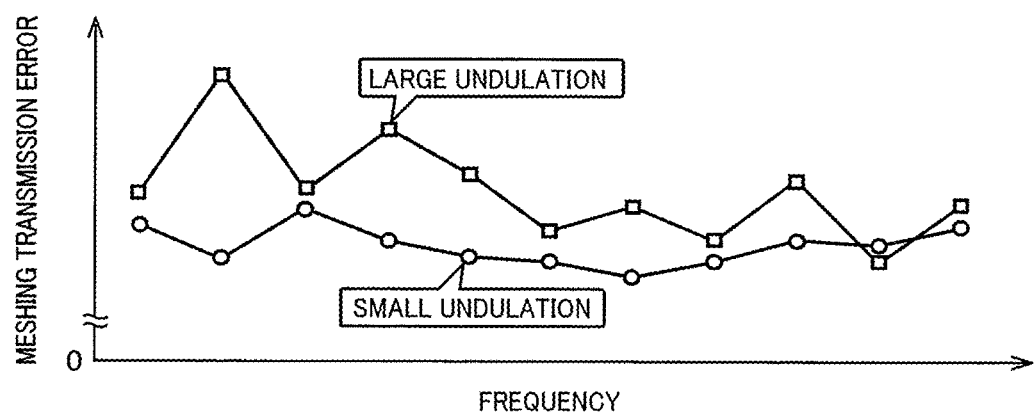
FIG. 8 is a diagram of result of measurement of respective meshing transmission errors with respect to two gears from which the uneven shape images shown in FIGS. 6 and 7 are obtained.

Since a minute uneven shape can be extracted, measurement can be performed for minute undulation having an amplitude of about 0.5 μm to 5 μm generated on the tooth surface 32 when the three-dimensional curved tooth surface 32 of the pinion 30 of the hypoid gear is ground-finished with a rotary grindstone etc., and since the minute undulation can properly be extracted for evaluation, optimum processing conditions etc. with reduced minute undulation can be set by measuring the minute undulation while adjusting the processing conditions etc., and the NV performance in a meshing high-order region attributable to the minute undulation can be improved. For example, FIGS. 6 and 7 show examples of uneven shape images represented by the uneven shape data D2 of the tooth surface 32 respectively obtained by changing the processing conditions etc. of the ground finish, showing the case of small undulation in FIG. 6 and the case of large undulation in FIG. 7, and when meshing transmission errors were measured for the pinion 30 in these cases, a result shown in FIG. 8 was obtained. From this result, it is seen that smaller undulation leads to a further reduction in the meshing transmission error, which enables suppression of the meshing vibration. A frequency on the horizontal axis of FIG. 8 corresponds to a rotation speed of the pinion 30.

The three-dimensional surface shape data D1 represents the surface shape of the tooth surface 32 with a multiplicity of the pixels px arranged in a rectangular lattice shape in the longitudinal and lateral directions, and the data is divided for each pixel px in a dividing direction that is one of the longitudinal and lateral directions to extract the data yi of the divided portion and to calculate the difference Wi between the data yi of the divided portion and the approximate curve equation f(x) for each pixel px, so that the uneven shape can be extracted with the highest accuracy based on the three-dimensional surface shape data D1.

Since the three-dimensional surface shape data D1 has each pixel px defined as a rectangular area of 1 μm or less on a side and has the height information with a resolution of 0.1 μm or less for each pixel px, a minute uneven shape such as minute undulation having a wavelength of about 0.5 mm to 5 mm and an amplitude of about 0.5 μm to 5 μm can properly be extracted.

Although the embodiment of the present invention has been described in detail with reference to the drawings, this is merely an embodiment, and the present invention can be implemented in variously modified and improved foil is based on the knowledge of those skilled in the art.

REFERENCE SIGNS LIST

30: Pinion (Measurement object) 32: Tooth surface (Surface) D1: Three-dimensional surface shape data D2: Uneven shape data Xn: Column (Divided portion) Yn: Row (Divided portion) px: Pixel yi: data of divided portion f(x): Approximate curve equation Wi: Difference

What is claimed is:

1. A method of measuring an uneven shape on a three-dimensional curved surface for measuring an uneven shape present on a three-dimensional curved surface of a measurement object and finer than the three-dimensional curved surface, the method comprising:
    a surface shape data acquiring step of acquiring three-dimensional surface shape data representative of a surface shape of the measurement object, the three-dimensional surface shape data being acquired from a three dimensional shape measuring apparatus that measures the surface shape of the measurement object;
    a dividing step of extracting two-dimensional data of a divided portion representative of a surface contour shape of the divided portion from the three-dimensional surface shape data, for each of divided portions acquired by dividing a surface of the measurement object in a certain dividing direction at regular intervals by a multiplicity of straight lines orthogonal to the dividing direction;
    a curve equation setting step of obtaining a curve equation approximating the entire area of the surface contour shape represented by the two-dimensional data of the divided portion for each of the divided portions;
    a difference calculation step of calculating a difference between the two-dimensional data of the divided portion and the curve equation for the entire area of the divided portion for each of the divided portions; and
    a difference combining step of combining two-dimensional data of the difference calculated for the entire area of the divided portion for each of the divided portions in the dividing direction to generate three-dimensional shape data representative of the uneven shape, wherein
    the three-dimensional surface shape data represents the surface of the measurement object with a multiplicity of pixels arranged in a rectangular lattice shape in longitudinal and lateral directions and has height information for each of the pixels,
    at the dividing step, the three-dimensional surface shape data is divided for each pixel in a dividing direction that is one of the longitudinal and lateral directions to extract as the two-dimensional data of the divided portion the height information of a multiplicity of pixels continuous in a cutting direction that is the other direction of the longitudinal and lateral directions, and
    at the difference calculation step, a difference between the two-dimensional data of the divided portion and the curve equation is calculated for the entire area of the divided portion for each pixel.

2. The method of measuring the uneven shape on the three-dimensional curved surface according to claim 1, wherein
    the three-dimensional curved surface of the measurement object is a tooth surface of a gear, and wherein
    the uneven shape includes minute undulation having an amplitude within a range of 0.5 μm to 5 μm.

3. The method of measuring the uneven shape on the three-dimensional curved surface according to claim 1, wherein
    the three-dimensional surface shape data has each pixel defined as a rectangular area of 1 μm or less on a side and has height information with a resolution of 0.1 μm or less for each pixel.

4. The method of measuring the uneven shape on the three-dimensional curved surface according to claim 2, wherein
    the three-dimensional surface shape data has each pixel defined as a rectangular area of 1 μm or less on a side and has height information with a resolution of 0.1 μm or less for each pixel.

5. The method of measuring the uneven shape on the three-dimensional curved surface according to claim 1, further comprising:
    displaying, on a display device, the generated three-dimensional shape data representative of the uneven shape.

* * * * *